United States Patent [19]

Timmler et al.

[11] 3,818,030
[45] June 18, 1974

[54] 1-IMIDAZOYL-METHANEPHOSPHONIC ACID ESTERS

[75] Inventors: Helmut Timmler, Wuppertal-Vohwinkel; Karl Heinz Buchel, Wuppertal-Elberfeld; Manfred Piempel, Wuppertal-Elberfeld, all of Germany

[73] Assignee: Bayer Aktiengesellschaft, Leverkusen, Germany

[22] Filed: Aug. 3, 1972

[21] Appl. No.: 277,630

[30] Foreign Application Priority Data
Aug. 14, 1971 Germany............................ 2140865

[52] U.S. Cl........ 260/309, 260/251 P, 260/256.4 E, 260/290 HL, 260/296 R, 260/297 P, 260/326.5, 260/326.61, 260/326.5, 260/332.3 R, 260/332.5, 260/346.1 R, 260/347.8, 260/953, 260/961, 424/200
[51] Int. Cl. ............................................... C07f 9/38
[58] Field of Search ................................... 260/309

[56] References Cited
UNITED STATES PATENTS
3,185,699  5/1965  Sherlock et al..................... 260/309
3,712,909  1/1973  Drabek et al....................... 260/309

FOREIGN PATENTS OR APPLICATIONS
1,925,994  11/1970  Germany ........................... 260/309
40-12620   6/1965   Japan................................. 260/309
40-13873   7/1965   Japan................................. 260/309
40-17583   8/1965   Japan................................. 260/309

OTHER PUBLICATIONS

Degterev et al., Chem. Abst., Vol. 74, No. 141637c, (1971), QD1.A51.

Nikolenko et al., Chem. Abst., Vol. 68, No. 59490s (1968), QD1.A51.

Razumov et al., Chem. Abst. Vol. 68. No. 3973t (1968), QD1.A51

Razumov et al. II, Chem. Abst. Vol. 70, No. 20160a, (1969), QD1.A51.

Primary Examiner—Natalie Trousof

[57] ABSTRACT

1-imidazolyl-methanephosphonic acid esters of the formula

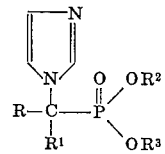

and their salts, especially the acid salts, wherein R is unsubstituted or substituted phenyl, $R^1$ is unsubstituted or substituted phenyl or an unsubstituted or substituted 5-, 6- or 7-membered heterocycle and $R^2$ and $R^3$ are the same or different and each is alkyl or cycloalkyl, are useful as antimycotics.

10 Claims, No Drawings

1-IMIDAZOYL-METHANEPHOSPHONIC ACID ESTERS

The present invention is concerned with 1-imidazolyl-methanephosphonic acid esters. These compounds, including their salts, exhibit antimycotic activity and are active against fungi pathogenic to humans and animals. The present invention, therefore, relates to said compounds, discloses two processes for their production, and includes pharmaceutical compositions utilizing one or more of said compounds as the active agent, and to methods of treating fungal infections in humans and animals which comprise administering said compounds to said human or animal.

It is known in the art that N-tritylimidazoles exhibit antimycotic activity. See, for example, Belgian patent No. 720,801 and U.S. Pat. Nos. 3,657,445, 3,658,956, and 3,660,576. It is also known that certain N-tritylimidazoles are active against fungi pathogenic against plants. See, for example, U.S. Pat. Nos. 3,321,366, 3,655,076, 3,655,077, 3,655,078, 3,655,079 and 3,666,862. However, it has not heretofore been known or suggested that 1-imidazolyl-methanephosphonic acid esters would exhibit antimycotic activity.

The present invention is, therefore, more particularly concerned with 1-imidazolyl-methanephosphonic acid esters of the formula

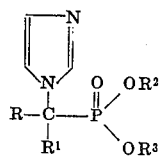

(I)

and their salts, especially the acid salts thereof, wherein R is unsubstituted or substituted phenyl, $R^1$ is unsubstituted or substituted phenyl or an unsubstituted or substituted 5-, 6-, or 7-membered heterocycle, and $R^2$ and $R^3$ are the same or different and each is alkyl or cycloalkyl.

When the compounds of the present invention are used in the form of their salts, the salts of physiologically tolerated acids are preferred. Such acids are the hydrogen halide acids, for example, hydrochloric acid and hydrobromic acid, especially hydrochloric acid; monofunctional and bifunctional carboxylic acids and hydroxycarboxylic acids, for example, acetic acid, maleic acid, succinic acid, fumaric acid, tartaric acid, citric acid, salicylic acid, sorbic acid and lactic acid; 1,5-naphthalenedisulfonic acid, and tribasic inorganic acids, for example, phosphoric acid. Thus, the preferred salts according to the present invention are the hydrogen halides, for example, the hydrochloride and hydrobromide, especially the hydrochloride; monofunctional and bifunctional carboxylates and hydroxycarboxylates, such as the acetate, maleate, succinate, fumarate, tartrate, citrate, salicylate, sorbate and lactate; 1,5-naphthalenedisulfonate and tribasic inorganic salts such as the phosphate.

When R is substituted phenyl, it may be substituted by one or more, preferably 1 to 2, substituents which may be either the same or different. Preferred substituents include halogen, especially fluorine, chlorine and bromine; straight- and branch-chain alkyl of 1 to 4 carbon atoms, and especially 1 to 2 carbon atoms, for example, methyl, ethyl, n- and i-propyl, n-, i-, and t-butyl; straight- and branch-chain alkoxy of 1 to 4 carbon atoms, especially 1 or 2 carbon atoms, for example, methoxy, ethoxy, n- and i-propoxy, and n-, i-, and t-butoxy; halogenalkyl of 1 to 3 carbon atoms, especially 1 or 2 carbon atoms and 1 to 5 halogen atoms, especially 3 halogen atoms, such as fluorine, chlorine or bromine, for example, trifluoromethyl and and trifluorodichloroethyl; and nitro.

When $R^1$ is substituted phenyl, it may be substituted by one or more, preferably 1 or 2, substituents which may be either the same or different. Preferred substituents include halogen, especially fluorine, chlorine and bromine; straight- and branch-chain alkyl of 1 to 4 carbon atoms, and especially 1 or 2 carbon atoms, for example, methyl, ethyl, n- and i-propyl, n-, i- and t-butyl; straight- and branch-chain alkoxy of 1 to 4 carbon atoms, especially 1 or 2 carbon atoms, for example, methoxy, ethoxy, n- and i-propoxy, and n-, i- and t-butoxy; halogenoalkyl of 1 to 3 carbon atoms, especially 1 or 2 carbon atoms and 1 to 5 halogen atoms, especially 3 halogen atoms, such as fluorine, chlorine, or bromine, for example, trifluoromethyl and trifluorodichloroethyl; and nitro. When $R^1$ is a 5-, 6-, or 7-membered heterocycle unsubstituted or substituted, the 5- and 6-membered heterocyclic rings are preferred, especially hetero-aromatic rings which contain 1 to 3, or particularly 1 or 2, hetero-atoms which may be the same or different. Nitrogen, oxygen and sulphur are the preferred hetero-atoms. When $R^1$ is a substituted heterocycle, it is substituted by one or more, preferably 1 or 2, substituents which may be the same or different. Preferred substituents are straight- and branched chain alkyl of 1 to 3 carbon atoms, especially 1 or 2 carbon atoms, for example, methyl, ethyl, n- and i-propyl; straight- and branched-chain alkoxy of 1 to 3 carbon atoms, especially 1 or 2 carbon atoms, for example, methoxy, ethoxy, and n- and i-propoxy; halogen, for example, fluorine, chlorine and bromine; and nitro.

Preferably, when $R^1$ is a heterocycle, it is unsubstituted. Preferred heterocyclic rings are pyridyl, pyrimidinyl, furyl, pyrryl, or thienyl. These rings can be linked to the tertiary carbon atom as indicated below:

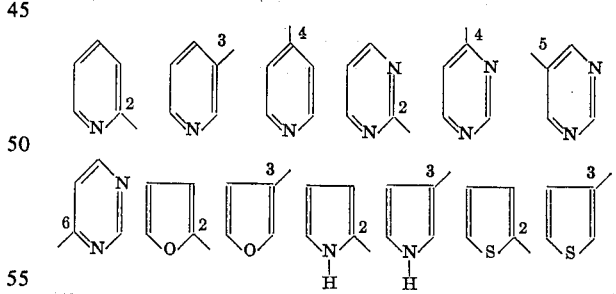

When $R^2$ and $R^3$ are alkyl, they are preferably straight- and branched-chain alkyl of 1 to 6 carbon atoms, more particularly of 1 to 4 carbon atoms, and especially 1 to 3 carbon atoms, for example, methyl, ethyl, n- and i-propyl, n-, i-, and t-butyl, pentyl and hexyl. When $R^2$ and $R^3$ are cycloalkyl, they are preferably cycloalkyl of 5 to 8 carbon atoms, and more preferably of 5 to 6 carbon atoms, for example, cyclopentyl, cyclohexyl, cycloheptyl, and cyclooctyl, especially cyclohexyl.

The compounds of the present invention, including their salts, show broad antimycotic activity and exhibit surprisingly low toxicity in animal tests.

The compounds of the present invention can be produced according to process a) and process b) described below:

a. an α-hydroxy-methanephosphonic acid ester of the general formula

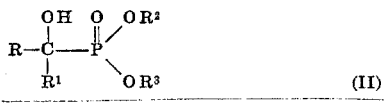

is reacted with thionyl-bis-imidazole of the general formula

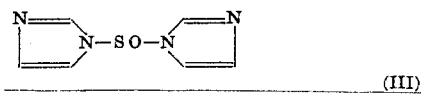

in the presence of a diluent;
or b. an α-halogeno-methanephosphonic acid ester of the general formula

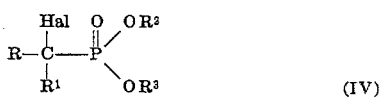

is reacted with imidazole in the presence of an acid-binding agent. In the above formulae, R, $R^1$, $R^2$ and $R^3$ are as above defined and Hal is chlorine or bromine.

If α-hydroxy-α,α-diphenyl-methanephosphonic acid diethyl ester and thionyl-bis-imidazole are used as the starting materials, the course of the reaction can be represented by the following equation [Process Variant (a)]:

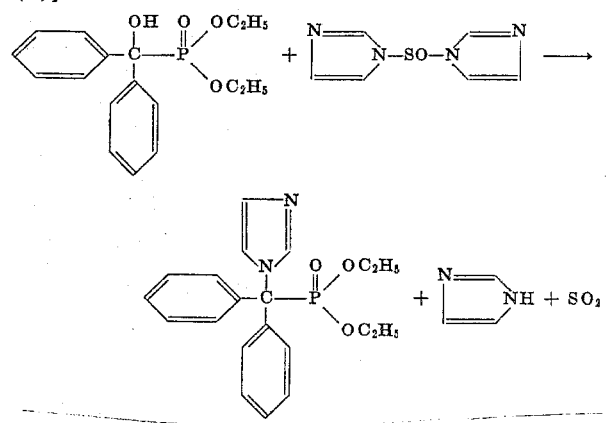

If α-chloro-α,α-diphenyl-methanephosphonic acid diethyl ester and imidazole are used as the starting materials, the course of the reaction can be represented by the following equation [(Process Variant (b)]:

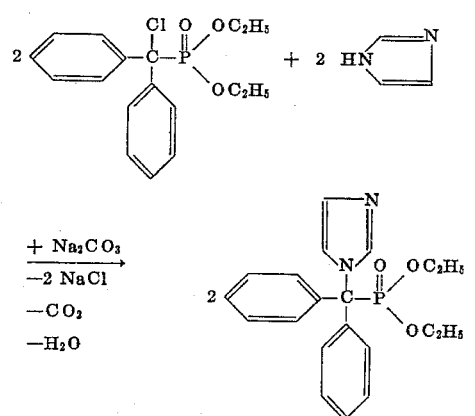

The compounds of the formula II which can be used as starting materials for the production of the new compounds in Process Variant (a) according to the invention were not previously known. They can be produced by reacting a compound of the formula:

with a compound of the formula:

wherein R, $R^1$, $R^2$ and $R^3$ are as defined above.

As a solvent for this reaction it is possible to employ any inert organic solvent, for example, benzine, ligroin, cyclohexane, benzene, diethyl ether or dioxane. Alternatively, the reaction can be carried out in the absence of a solvent. The reaction is generally carried out in the presence of 0.01 to 0.03 mol of alkali alcoholate, for example, sodium ethylate, per mol of ketone of formula V at temperatures of between 0° and 30° C. The compounds of the formulae V and VI are preferably employed in molar amounts. If appropriate, 2 to 5 mols of the compound of formula VI can also be used per mol of ketone of formula V. The reaction products of the formula II can be isolated by diluting the reaction mixture with ligroin. The hydroxyphosphonic acid ester used in the Process Variant (a) according to the invention, of formula II, is then obtained as a colorless precipitate (compare Production Example 8). The compounds can be purified in accordance with customary methods.

Examples of the starting materials of formula II include:

α-hydroxy-α,α-diphenyl-methanephosphonic acid diethyl ester,
α-hydroxy-α-phenyl-α-(4-chlorophenyl)-methanephosphonic acid diethyl ester,
α-hydroxy-α,α-bis-(4-chlorophenyl)-methanephosphonic acid diethyl ester,
α-hydroxy-α-phenyl-α-(4-fluorophenyl)-methanephosphonic acid diethyl ester,
α-hydroxy-α-phenyl-α-(4-chlorophenyl)-methanephosphonic acid diisopropyl ester,
α-hydroxy-α-phenyl-α-(4-pyridyl)-methanephosphonic acid diethyl ester,
α-hydroxy-α,α-diphenylmethanephosphonic acid ethyl-cyclohexyl ester and
α-hydroxy-α-phenyl-α-(4-methylphenyl)-methanephosphonic acid diethyl ester.

The α-halogeno-α,α-diaryl- (or α-aryl-α-heteroaryl)-methanephosphonic acid esters of formula IV which are used as starting materials in Process Variant (b) according to the invention were not previously known. They can be produced by reacting a stoichiometric amount of the appropriate starting compound of formula II with a halogenating agent, such as phosphorus pentahalide, thionyl chloride and bromosuccinimide, optionally in the presence of a solvent, for example, carbon tetrachloride, and preferably at the boiling point of the solvent, if present. After distilling off the solvent, the compound of formula IV is obtained as a solid and can be purified in the customary manner by recrystallization (see Example 9).

Examples of the starting materials of formula IV include:

α-chloro-α,α-diphenyl-methanephosphonic acid diethyl ester,
α-chloro-α-phenyl-α-(4-chlorophenyl)-methanephosphonic acid diethyl ester,
α-chloro-α,α-bis-(4-chlorophenyl)-methanephosphonic acid diethyl ester,
α-chloro-α-phenyl-α-(4-fluorophenyl)-methanephosphonic acid diethyl ester,
α-chloro-α-phenyl-α-(4-chlorophenyl)-methanephosphonic acid diisopropyl ester,
α-chloro-α-phenyl-α-(4-pyridyl)-methanephosphonic acid diethyl ester,
α-chloro-α,α-diphenyl-methanephosphonic acid ethylcyclohexyl ester and
α-chloro-α-phenyl-α-(4-methylphenyl)-methanephosphonic acid diethyl ester.

For the reaction used in the Process Variant (a) according to the invention there may be used any inert organic solvent. The solvent used is preferably an organic aprotic solvent, especially a nitrile such as acetonitrile, an ether such as diethyl ether, diisopropyl ether or tetrahydrofurane, an acid amide, such as dimethylformamide or hexamethyl-phosphoric acid triamide or a halogenated hydrocarbon such as chloroform or methylene chloride.

In Process Variant (a) the reaction temperatures can be varied over a substantial range. In general, the reaction is carried out at a temperature of between 0° and 150° C, preferably between 20° and 120° C.

In carrying out Process Variant (a) according to the invention, preferably 1 to 2 mol, especially about 1 mol, of thionyl-bis-imidazole of formula III is employed per mol of α-hydroxy-α,α-diaryl- (or α-heteroaryl)-methanephosphonic acid ester of formula II.

When the compounds of the invention are produced according to Process Variant (a), the compounds can be isolated according to the usual known procedures. The isolation can, for example, be carried out as follows: first the solvent is distilled off and the residue is treated with water, taken up with ethyl acetate and extracted with dilute hydrochloric acid. The hydrochloric acid solution is rendered alkaline with sodium carbonate. An oil then separates out, which is taken up in a little ethyl acetate and triturated with petroleum ether. After some time, the oil solidifies to give crystals.

In Process Variant (b), any polar inert organic solvent can be used. The solvent used is preferably an alkyl nitrile generally having 1–4 carbon atoms, such as acetonitrile, an alkyl ketone, generally having 1 to 4 carbon atoms, such as diethyl ketone, an ether, such as dioxane or tetrahydrofurane, an acid amide, such as dimethylformamide or hexamethyl-phosphoric acid triamide, or dimethylsulphoxide.

As an acid-binding agent, one can use any of the usual known acid-binding agents. The preferred acid-binding agents include alkali metal hydroxides, especially sodium hydroxide and potassium hydroxide, alkali metal carbonates, especially sodium carbonate and potassium carbonate, alkaline earth metal carbonates, especially calcium carbonate, and organic bases, especially lower trialkyamines and heterocyclic bases. The following are particularly preferred: potassium carbonate, sodium carbonate, calcium carbonate, triethylamine, pyridine, lutidine. It is also possible to use, instead of a separate acid-binding agent, an excess of imidazole.

In Process Variant (b) the reaction temperatures can be varied over a substantial range. In general the reaction is carried out at between 20° and 200° C, preferably between 60° and 120° C.

In carrying out the Process Variant (b), the starting materials of formula IV, namely the imidazole and the acid-binding agent, are preferably employed in about molar amounts. If an excess of imidazole is added to act as an acid-binding agent, 2 to 3 mols of imidazole are generally used.

When the compounds of the present invention are produced according to Process Variant (b), the compounds can be isolated according to the usual known procedures. The isolation can, for example, take place as follows. The solvent is first distilled off and the resulting oil is digested with water, taken up in ethyl acetate and treated with dilute hydrochloric acid as already described for Process Variant (a). The base is precipitated from the hydrochloric acid solution by means of sodium carbonate and, the compound of the formula I is thereby obtained as a white solid.

The free 1-imidazolyl-methanephosphonic acid esters of the formula I and their salts can be interconverted in any suitable manner; methods for such interconversion are known.

The following 1-imidazolyl-methanephosphonic acid esters are representative of the compounds of the present invention:

TABLE 1

1. α-1-Imidazolyl-α,α-diphenyl-methanephosphonic acid diethyl ester
2. α-1-Imidazolyl-α-phenyl-α-(4-chlorophenyl)-methanephosphonic acid diethyl ester
3. α-1-Imidazolyl-α,α-bis-(4-chlorophenyl)-methanephosphonic acid diethyl ester
4. α-1-Imidazolyl-α-phenyl-α-(4-fluorophenyl)-methanephosphonic acid diethyl ester
5. α-1-Imidazolyl-α-phenyl-α-(4-chlorophenyl)-methanephosphonic acid diisopropyl ester
6. α-1-Imidazolyl-α-phenyl-α-(4-pyridyl)-methanephosphonic acid diethyl ester
7. α-1-Imidazolyl-α,α-diphenyl-methanephosphonic acid ethylcyclohexyl ester
8. α-1-Imidazolyl-α-phenyla-(4-methylphenyl)-methanephosphonic acid diethyl ester.

The compounds of the present invention exhibit strong antimycotic effects. They display a good and broad activity against human-pathogenic and animal-pathogenic fungi. The spectrum of action embraces Dermatophytes (such as Trichophyton, Microsporon and Epidermophyton), blastomyces (such as Candida and Cryptococcus), molds (such as Aspergillus), and biphasic fungi (such as Histoplasma or Coccidioides immitis). The active compounds can be used in human medicine and in veterinary medicine.

Fields of use in human medicine are, for example, dermatomycoses and systemic-mycoses caused by Trichophyton mentagrophytes and other varieties of Trichophyton, varieties of Microsporon, Epidermophyton floccosum, blastomyces, biphasic fungi and molds, especially those mycoses which are caused by the above-mentioned organisms.

Fields of use in veterinary medicine include all dermatomycoses and systemic-mycoses, especially those which are caused by the above-mentioned organisms.

The present invention as mentioned above includes pharmaceutical compositions comprising one or more compounds of the present invention in combination with a pharmaceutically acceptable, non-toxic, inert diluent or carrier. The diluent or carrier may be a solid or liquified gaseous diluent or it may be a liquid diluent other than a solvent of a molecular weight less than 200 (preferably less than 350), except in the presence of a surface-active agent. The pharmaceutical compositions according to the present invention may be produced in a form of a sterile or isotonic aqueous solution.

The present invention also includes a medicament in dosage unit form comprising a compound of the invention either alone or in combination with a diluent or carrier.

The present invention also includes a medicament in the form of tablets (including lozenges and granules), dragees, capsules, pills, ampoules or suppositories comprising a compound of the invention either alone or in combination with a diluent or carrier.

"Medicament" as used in this specification means physically discrete coherent portions suitable for medical administration. "Medicament in dosage unit form" as used in this specification means physically discrete coherent portions suitable for medical administration each containing a daily dose or a multiple (up to four times) or submultiple (down to a fortieth) of a daily dose of the compound of the invention. Whether the medicament contains a daily dose or, for example, a half, a third, or a quarter of a daily dose, will depend on whether the medicament is to be administered once or, for example, twice, three times or four times a day respectively.

The pharmaceutical compositions according to the present invention may, for example, be in the form of ointments, gels, pastes, creams, sprays (including aerosols), lotions, suspensions, solutions and emulsions of the active ingredient in aqueous or non-aqueous diluents, syrups, granules or powders.

The diluents to be used in pharmaceutical compositions (e.g., granulates) adapted to be formed into tablets, dragees, capsules and pills include the following: (a) fillers and extenders, e.g. starch, sugars, mannitol, and silicic acid; (b) binding agents, e.g. carboxymethyl cellulose and other cellulose derivatives, alginates, gelating and polyvinyl pyrrolidone; (c) moisturing agents, e.g. glycerol; (d) disintegrating agents, e.g. agar-agar, calcium carbonate and sodium bicarbonate; (e) agents for retarding dissolution e.g. paraffin; (f) resorption accelerators, e.g. quaternary ammonium compounds; (g) surface active agents, e.g. cetyl alcohol, glycerol monostearate; (h) adsorptive carriers, e.g. kaolin and bentonite; (i) lubricants, e.g. talc, calcium and magnesium stearate and solid polyethylene glycols.

The tablets, dragees, capsules and pills formed from the pharmaceutical compositions of the invention can have the customary coatings, envelopes and protective matrices, which may contain opacifiers. They can be so constituted that they release the active ingredient only or preferably in a particular part of the intestinal tract, possibly over a period of time. The coatings, envelopes and protective matrices may be made, for example, of polymeric substances or waxes.

The ingredient can also be made up in microencapsulated form together with one or several of the above-mentioned diluents.

The diluents to be used in pharmaceutical compositions adapted to be formed into suppositories can, for example, be the usual water-soluble or water-insoluble diluents, such as polyethylene glycols and fats (e.g. cocoa oil and high esters [e.g. $C_{14}$-alcohol with $C_{16}$-fatty acid]) or mixtures of these diluents.

The pharmaceutical compositions which are ointments, pastes, creams and gels can, for example, contain the usual diluents, e.g. animal and vegetable fats, waxes, paraffins, starch, tragacanth, cellulose derivatives, polyethylene glycols, silicones, bentonites, silicic acid, talc and zinc oxide or mixtures of these substances.

The pharmaceutical compositions which are powders and sprays can, for example, contain the usual diluents, e.g. lactose, talc, silicic acid, aluminium hydroxide, calcium silicate, and polyamide powder or mixtures of these substances. Aerosol sprays can, for example, contain the usual propellants, e.g. chlorofluorohydrocarbons.

The pharmaceutical compositions which are solutions and emulsions can, for example, contain the customary diluents (with, of course, the above-mentioned exclusion of solvents having a molecular weight below 200 except in the presence of a surface-active agent), such as solvents, dissolving agents and emulsifiers; specific examples of such diluents are water, ethyl alcohol, isopropyl alcohol, ethyl carbonate, ethyl acetate, benzyl alcohol, benzyl benzoate, propylene glycol, 1,3-butylene glycol, dimethylformamide, oils [for example groundnut oil], glycerol, tetrahydrofurfuryl alcohol, polyethylene glycols and fatty acid esters of sorbitol or mixtures thereof.

For parenteral administration, the solutions and emulsions should be sterile, and, if appropriate, blood-isotonic.

The pharmaceutical compositions which are suspensions can contain the usual diluents, such as liquid diluents, e.g. water, ethyl alcohol, propylene glycol, surface-active agents (e.g. ethoxylated isostearyl alcohols, polyoxyethylene sorbite and sorbitane esters), microcrystalline cellulose, aluminium metahydroxide, bentonite, agar-agar and tragacanth or mixture thereof.

All the pharmaceutical compositions according to the invention can also contain coloring agents and preservatives as well as perfumes and flavoring additions (e.g., peppermint oil and eucalyptus oil) and sweetening agents (e.g., saccharin)

The pharmaceutical compositions according to the invention preferably contain about 0.1 to 99.5, more preferably from about 0.5 to 95 percent of the active ingredient by weight of the total composition.

A preferred pharmaceutical composition for local administration, for example to dermatomycoses, is an approximately 1 percent solution of the active ingredient in polyethylene glycol of molecular weight 400.

In addition to a compound of the inventiono the pharmaceutical compositions and medicaments according to the invention can also contain other pharmaceutically active compounds. They may also contain a plurality of compounds of the invention.

Any diluent in the medicaments of the present invention may be any of those mentioned above in relation to the pharmaceutical compositions of the present invention. Such medicaments may include solvents of molecular weight less than 200 as sole diluent.

The discrete coherent portions constituting the medicament according to the invention (whether in dosage unit form or not) may be, for example, any of the following: tablets, (including lozenges and granules), pills, dragees, capsules, suppositories and ampoules. Some of these forms may be made up for delayed release of the active ingredient. Some, such as capsules, include a protective envelope which renders the portions of the medicament physically discrete and coherent.

The preferred daily dose for administration of the medicaments of the invention is 2,000 to 20,000 mg. preferably 2,000–10,000 mg. of active ingredient.

The production of the above-mentioned pharmaceutical compositions and medicaments is carried out by any method known in the art, for example, by mixing the active ingredient(s) with the diluent(s) to form a pharmaceutical composition (e.g. a granulate) and then forming the composition into the medicament (e.g. tablets).

The present invention as mentioned above also includes a method for treating, which includes the prevention, relief and cure of, fungal infections in human and non-human animals which comprises administering to such animals an antifungal amount of a compound of the present invention, either alone or in the form of a pharmaceutical composition as above described.

The compounds and pharmaceutical compositions of the present invention are intended for oral, parenteral, for example, intramuscular, intraperatoneal and intravenous, rectal and topical, preferably oral or topical use. The preferred pharmaceutical compositions are therefore those which are in oral or topical administration form.

In general it has proved advantageous to administer amounts of from 20 mg to 120 mg/kg, preferably 50 to 100 mg/kg, of body weight twice every 24 hours to achieve effective results. Nevertheless, it is at times necessary to deviate from those dosage rates, and in particular to do so as a function of the nature and body weight of the human or animal subject to be treated, the individual reaction of this subject to the treatment, the type of formulation in which the active ingredient is administered and the mode in which the administration is carried out, and the point in the progress of the disease or interval at which it is to be administered. Thus, it may in some cases suffice to use less than the above-mentioned minimum dosage rate, while in other cases the upper limit mentioned must be exceeded to achieve the desired results. Where larger amounts are administered it can be advisable to divide these into several individual administrations over the course of the day.

The following in vitro and in vivo Tests demonstrate the antimycotic activity of the compounds according to the invention.

A. IN VITRO TESTS

Table 2 summarises the minimum inhibitory concentrations (MIC) of some typical compounds according to the invention against various species of fungi. The MIC was determined in the series dilution test. The nutrient media used were:

1. for dermatophytes and moulds, Saboraud's milieu d'epreuve.
2. For blastomyces, meat broth-glucose bouillon. Incubation took place for 48 to 96 hours and the growth was recorded daily. The incubation temperature was 28°C.

Table 2

| Compound from Table 1 No. | M I C in γ/ml of Nutrient Medium in the | | | | |
|---|---|---|---|---|---|
| | Trichophyton mentagrophytes | Candida albicans | Microsporon felineum | Aspergillus niger | Penicillium commune |
| 1 | 10 | 10 | 10 | 40 | 100 |
| 2 | 100 | 40 | 10 | 40 | 100 |
| 3 | 40 | 20 | 4 | 40 | 100 |
| 4 | 40 | 40 | 10 | 100 | 100 |
| 5 | 20 | 20 | 10 | 40 | 100 | b. In Vivo Tests: Antimycotic action in animal experiments.

Experimental candidosis in mice served as the model for testing the in vivo activity of the new active compounds.

Male mice of the $CF_1$-SPF strain, weighing 20–22 g, Altromin pellet fodder and water ad libitum are intravenously infected with $2 \times 10^6$ washed cells of Candida albicans, suspended in physiological sodium chloride solution, by puncture of the vein of the tail. Untreated animals die 3 to 6 days after infection.

If infected animals are treated twice daily, starting from the day of infection up to the 6th. day after infection, with doses of 25–50 mg/kg of body weight of the compounds 1–5 of Table 1, administered orally by means of a stomach tube, the survival rates of the treated animals 6 days after infection are 40–90 percent (Table 3). In the case of the untreated control animals, only 10 percent survive on the 6th. day after infection.

Table 3

| Compound from Table 2 No. | Survival Rates in % on the 6th. Day after Infection | Daily Dose, mg/kg |
|---|---|---|
| 1 | 80 | 2 × 50 |
| 2 | 70 | 2 × 50 |
| 3 | 40 | 2 × 50 |
| 4 | 70 | 2 × 50 |
| 5 | 90 | 2 × 50 |
| Control | 10 | |

At a dosage of 2 × 25 mg/kg daily, an average of 30 to 50 percent of the treated animals survived on the 6th day after production of the compounds according to the invention by the processes according to the invention.

EXAMPLE 1:

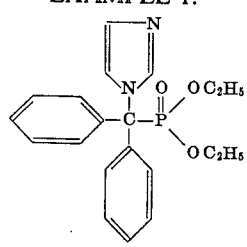

PROCESS VARIANT (A)

A solution of 23.7 g (0.13 mol) of thionyl-bis-imidazole in 100 ml of acetonitrile is added to a solution of 32 g (0.1 mol) of α-hydroxy-α,α-diphenylmethanephosphonic acid diethyl ester in 100 ml of acetonitrile, while stirring. After standing for 12 hours at room temperature (approx. 20°C) the reaction mixture is heated to the boil for 3 hours, the solvent is then distilled off and the residue is treated with water. The mixture is taken up in ethyl acetate and extracted 3 times with 50 ml of dilute hydrochloric acid at a time. The combined hydrochloric acid solutions are treated with sodium carbonate until the solution is alkaline. Hereupon, the phosphonic acid ester separates out as an oil. This oil is taken up in a little ethyl acetate and subsequently triturated with petroleum ether, whereupon it solidifies to give crystals.

After recrystallisation from ligroin/benzene, 18 g (50 percent of theory) of α-1-imidazolyl-α,α-diphenyl-methanephosphonic acid diethyl ester of melting point 73°C are obtained.

PROCESS VARIANT (B):

34 g (0.1 mol) of α-chloro-α,α-diphenyl-methanephosphonic acid diethyl ester and 17.5 g (0.25 mol) of imidazole are dissolved in 200 ml of acetonitrile and the mixture is heated to the boil for 15 hours. After distilling off the solvent, the oily residue is digested with water and taken up in ethyl acetate. The mixture is extracted 3 times with dilute hydrochloric acid and the combined hydrochloric acid extracts are treated with sodium carbonate until the free base separates out.

15 g (45 percent of theory) of α-1-imidazolyl-α,α-diphenyl-methanephosphonic acid diethyl ester of melting point 73°C are obtained.

In Examples 2 to 8, the compounds shown in Table 4 were obtained by processes analogous to those described above in Example 1 from thionyl-bis-imidazole and the α-hydroxy-methanephosphonic acid esters set forth in Table 5 or from imidazole and the corresponding α-halogeno-methanephosphonic acid ester.

The α-hydroxy-α,α-diphenyl-methanephosphonic acid diethyl ester required in Examples 1 to 8, Process Variant (a), as the starting material may be produced as follows:

EXAMPLE 8:

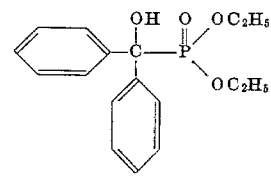

69 g (0.5 mol) of diethyl phosphite and 91 g (0.5 mol) of benzophenone are mixed. A solution of 0.25 g (0.01 mol) of sodium in 4 ml of ethanol is slowly added dropwise, while stirring and ensuring, through ice cooling, that the temperature does not rise above 5°C. After 15 minutes' reaction time, the mixture is diluted with petroleum ether, whereupon the phosphonic acid ester separates out as a solid.

107 g (67 percent of theory) of α-hydroxy-α,α-diphenyl-methanephosphonic acid diethyl ester of melting point 154°C are obtained.

The α-chloro-α,α-diphenyl-methanephosphonic acid diethyl ester required in Examples 1 to 8, Process Variant (b), as the starting material may be produced as follows:

TABLE 4

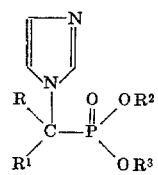

| Example number | R | R¹ | R² | R³ | Melting point, °C |
|---|---|---|---|---|---|
| 2 | ⟨phenyl⟩ | Cl-⟨phenyl⟩ | $C_2H_5$ | $C_2H_5$ | 156 |
| 3 | Cl-⟨phenyl⟩ | Same as above | $C_2H_5$ | $C_2H_5$ | 132 |
| 4 | ⟨phenyl⟩ | F-⟨phenyl⟩ | $C_2H_5$ | $C_2H_5$ | 120 |
| 5 | Same as above | Cl-⟨phenyl⟩ | $CH(CH_3)_2$ | $CH(CH_3)_2$ | 119 |
| 6 | do | ⟨pyridyl-N⟩ | $C_2H_5$ | $C_2H_5$ | 60 |
| 7 | do | ⟨phenyl⟩ | $C_2H_5$ | -⟨H⟩ | 84 |
| 8 | do | $CH_3$-⟨phenyl⟩ | $C_2H_5$ | $C_2H_5$ | ——— |

EXAMPLE 9

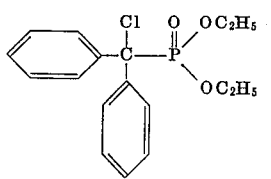

32 g (0.1 mol) of α-hydroxy-α,α-diphenyl-methanephosphonic acid diethyl ester are dissolved in 500 ml of carbon tetrachloride. 20.8 g (0.1 mol) of phosphorus pentachloride are added while stirring and the suspension is heated to the boil for 2 hours. After being obtained, the reaction mixture is poured onto ice water and the organic phase is separated off, washed with sodium bicarbonate solution and subsequently washed until neutral, and dried. The residue obtained after distilling off the solvent can be recrystallise from ligroin.

25 g (73 percent of theory) of α-chloro-α,α-diphenyl-methanephosphonic acid diethyl ester of melting point 63°C are obtained.

The starting materials indicated in Table 5 can be produced by processes analogous to that described in Example 8.

TABLE 5

$$\begin{array}{c} R \quad OH \quad O \quad OR^2 \\ \diagdown | \quad \| \diagup \\ C-P \\ \diagup \quad \diagdown \\ R^1 \quad OR^3 \end{array}$$

| Example number | R | R¹ | R² | R³ | Melting point, °C. |
|---|---|---|---|---|---|
| 10 | ⌬— | Cl—⌬— | C₂H₅ | C₂H₅ | 137 |
| 11 | Cl—⌬— | Cl—⌬— | C₂H₅ | C₂H₅ | 154 |
| 12 | ⌬— | F—⌬— | C₂H₅ | C₂H₅ | 155 |
| 13 | Same as above | Cl—⌬— | CH(CH₃)₂ | CH(CH₃)₂ | 164 |
| 14 | ...do... | N⌬— | C₂H₅ | C₂H₅ | 142 |

The hydroxy compounds can be converted into the corresponding halogeno compounds as described in Example 9.

All other starting substances required for the production of the compounds of general formula I can be produced as described in Examples 8 and 9.

What we claim is:

1. A 1-imidazolyl-methanephosphonic acid ester of the formula

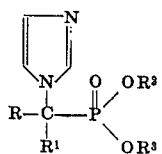

(I)

or a physiologically acceptable salt thereof wherein
R is phenyl unsubstituted or mono-substituted by a member selected from the group consisting of fluorine, chlorine, bromine, alkyl of one or two carbon atoms, alkoxy of one or two carbon atoms, trifluoromethyl, trifluorodichloroethyl and nitro;
R¹ is phenyl, chlorophenyl, fluorophenyl or tolyl; and R² and R³ are the same or different and each is a straight- or branch-chain alkyl of up to three carbon atoms or cycloalkyl of five to six carbon atoms.

2. A compound according to claim 1 in the form of a salt selected from the group consisting of the hydrochloride, hydrobromide, acetate, maleate, succinate, fumarate, citrate, salicylate, sorbate, lactate, 1,5-naphthalenedisulphonate and phosphate.

3. A compound according to claim 1 wherein R is phenyl or chlorophenyl, R¹ is phenyl, chlorophenyl, fluorophenyl or tolyl, and R² and R³ are the same or different and each is ethyl, isopropyl or cyclohexyl.

4. The compound according to claim 1 which is α-1-imidazolyl-α,α-diphenyl-methanephosphonic acid diethyl ester.

5. The compound according to claim 1 which is α-1-imidazolyl-α-phenyl-α-(4-chlorophenyl)-methanephosphonic acid diethyl ester.

6. The compound according to claim 1 which is α-1-imidazolyl-α,α-bis-(4-chlorophenyl)-methane phosphonic acid diethyl ester.

7. The compound according to claim 1 which is α-1-imidazolyl-α-phenyl-α-(4-fluorophenyl)-methanephosphonic acid diethyl ester.

8. The compound according to claim 1 which is α-1-imidazolyl-α-phenyl-α-(4-chlorophenyl)-methanephosphonic acid diisopropyl ester.

9. The compound according to claim 1 which is α-1-imidazolyl-α,α-diphenyl-methanephosphonic acid ethylcyclohexyl ester.

10. The compound according to claim 1 which is α-1-imidazolyl-α-phenyl-α-(4-methyl-phenyl)-methanephosphonic acid diethyl ester.

* * * * *